UNITED STATES PATENT OFFICE.

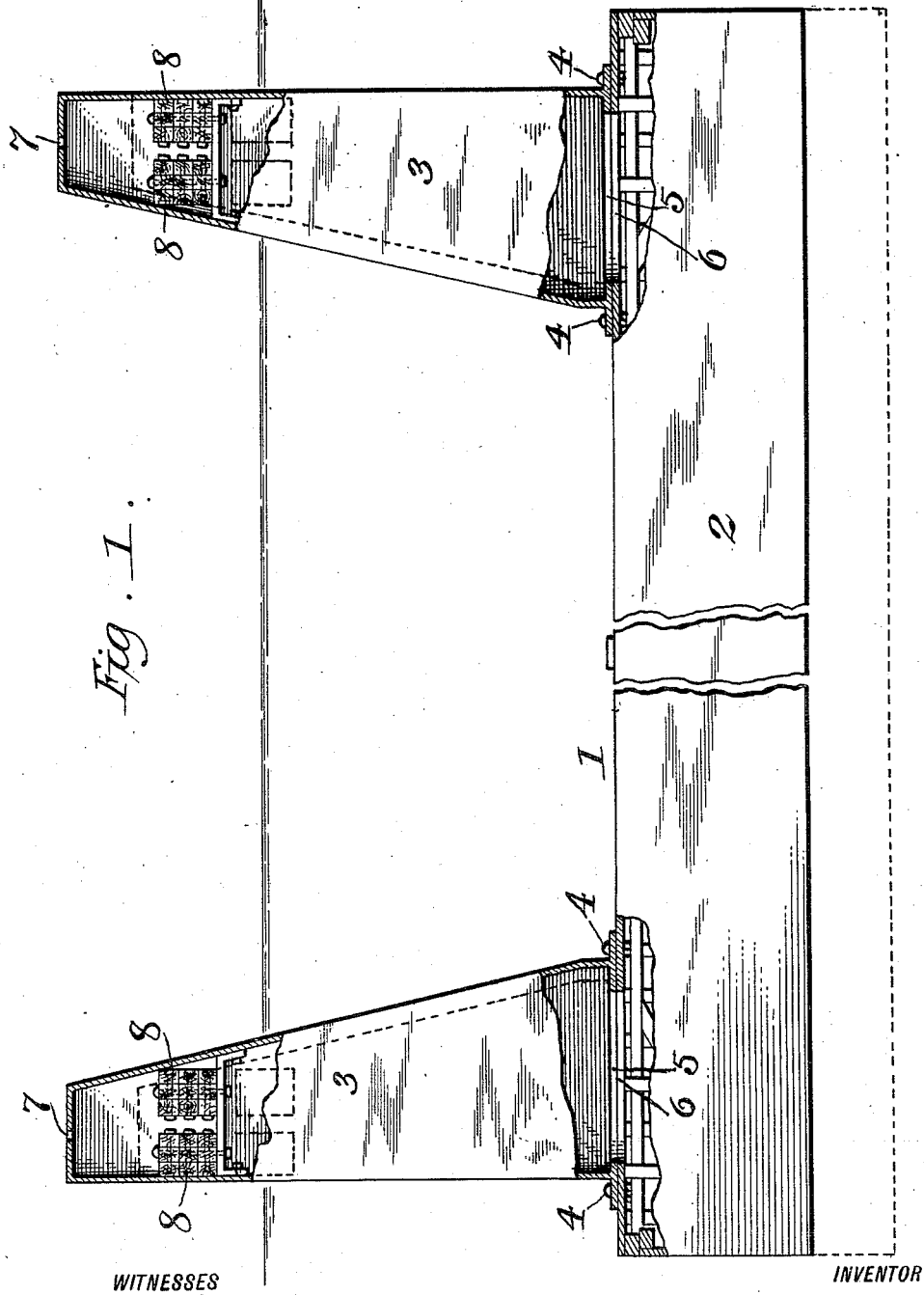

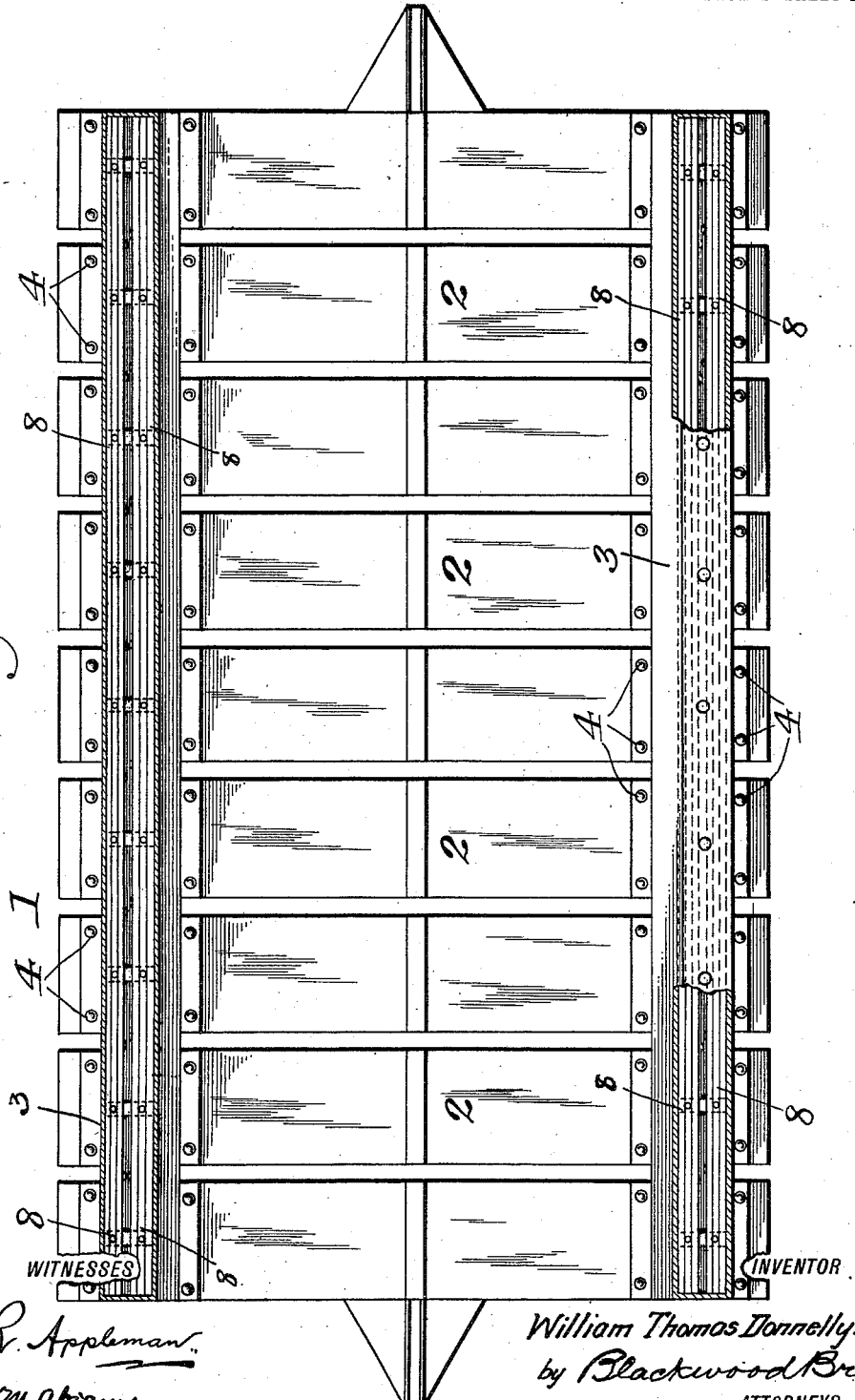

WILLIAM THOMAS DONNELLY, OF BROOKLYN, NEW YORK.

FLOATING DRY-DOCK.

1,019,434. Specification of Letters Patent. Patented Mar. 5, 1912.

Application filed September 17, 1910. Serial No. 582,515.

*To all whom it may concern:*

Be it known that I, WILLIAM THOMAS DONNELLY, a citizen of the United States, residing at Brooklyn, in the county of Kings and State of New York, have invented certain new and useful Improvements in Floating Dry-Docks, of which the following is a specification.

My invention relates to floating dry docks. It sometimes happens, by reason of the gates or pumps getting out of order or the dock leaking, that the dock is entirely submerged and sunk, and if this happens in deep water it is lost.

My invention therefore has for its object to obviate all chances of the dock being lost through sinking or being entirely submerged, by providing a floating dry dock having combined ballast and buoyant means located in the wings normally above the water line therein at approximately the greatest normal degree of submergence of the dock, when under control, and thereby normally acting as ballast to aid in submerging the dock, and adapted, when control of the dock is lost, to be thereby submerged and caused to serve as buoyancy and prevent the dock from being entirely submerged and perhaps lost.

It has for a further object, preferably, to construct the combined ballast and buoyant means in a solid form so that it will be non-sinkable even if penetrated or damaged and therefore insure that it will perform its functions when required.

It has for a still further object to provide a device of the character above set forth which is simple and strong in construction and absolutely reliable in operation.

In the drawings: Figure 1 is an end view, partly broken away and in section, the full lines indicating the position of the dock and the ballast and reserve buoyancy, when the dock is under control, and submerged to approximately its greatest normal degree of submergence and the dotted lines indicating the position of the dock and the ballast and reserve buoyancy, when control of the dock has been lost, and the reserve buoyancy is preventing the dock from being entirely submerged. Fig. 2, a top plan view on a reduced scale, partly broken away and in section.

I have illustrated the invention forming the subject of this application applied to the floating dry dock forming the subject of my Patent No. 920,282, May 4th, 1909, for the reason that it is particularly applicable to this form of dock, although it is also applicable to other forms of docks; for instance, docks made wholly of wood or composite wood and metal docks.

Referring to the drawings in which like reference characters designate corresponding parts, 1 designates the floating dry dock above referred to, which is composed of a series of hollow wooden pontoons 2 and hollow sides or wings 3, made of steel or other suitable metal and air and watertight, mounted on the series of pontoons and secured thereto by bolts 4 or other suitable means.

To allow water to pass during the operation of the dock, from the pontoons into the wings and vice versa, openings 5 are provided in the bottoms of the wings registering with openings 6 in the tops of the pontoons, and to allow air to escape from the wings as the water enters, from the pontoons, openings 7 are provided in the tops of the wings.

The pontoons are designed to be applied with the usual keel blocks and bilge blocks to support a ship, with water inlets and outlets and valves therefor to allow water to be admitted to the dock to sink it and to be expelled and excluded therefrom to raise and sustain it afloat, and centrifugal pumps to expel the water, but it is not deemed necessary to show them or describe them as they form no part of this invention.

The combined ballast and reserve buoyancy forming the particular subject of this invention, in connection with the dock, consists of solid beams of wood 8 secured in the upper part of the wings above the normal water line therein at approximately the greatest normal degree of submergence of the dock, when under control, and thereby normally serve as ballast to aid in submerging the dock, and adapted, when control of the dock is lost, to be automatically submerged by the submerging of the dock slightly below approximately its greatest normal degree of submergence, when under control, and at such time on acount of the adjustment of the total displacement to the total weight of the structure, bringing them into such a condition that the weight only slightly exceeds the displacement, the entering into the water of the material forming the combined ballast and reserve buoyancy, increases the displacement until it equals the total weight, and the structure ceases to descend and is sustained afloat when that part of the structure remaining above the surface of the water represents the actual reserve buoyancy, thus the dock is prevented from being entirely submerged and lost.

The solid wooden beams 8 forming the combined ballast and reserve buoyancy are placed together in compact form within the wings at their tops on each side and extend the entire length thereof, and on account of being solid are non-sinkable.

From the foregoing description, considered in connection with the accompanying drawings, it will be understood that the dock will be submerged to approximately its greatest normal degree of submergence when under control, by the water admitted therein aided by the beams forming the combined ballast and reserve buoyancy, but that as soon as control of the dock is lost; that is, as soon as it is submerged slightly below approximately its greatest degree of submergence, the beams forming the combined ballast and reserve buoyancy are thereby automatically submerged and serve as buoyancy to sustain the dock afloat, and on account of being solid, these beams are non-sinkable even if penetrated or damaged and therefore they are always to be absolutely relied upon.

I do not desire to be understood as limiting myself to the specific details of construction and arrangements as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims:

I claim:

1. In a floating dry dock, heavy solid buoyant means formed of wood and located in the top of the wings normally above the water line thereof at approximately the greatest degree of submergence of the dock, when under control and thereby normally acting as ballast and adapted, when control of the dock is lost, to be thereby automatically submerged and caused to act as buoyancy and prevent the dock from being entirely submerged, substantially as described.

2. In a floating drydock, heavy non-sinkable solid sectional buoyant means formed of wood and located in the top of the wings normally above the water line thereof at approximately the greatest degree of submergence of the dock, when under control, and thereby normally acting as ballast and adapted when control of the dock is lost, to be thereby automatically submerged and caused to act as buoyancy and prevent the dock from being entirely submerged, substantially as described.

In testimony whereof I have signed my name in the presence of two subscribing witnesses.

WILLIAM THOMAS DONNELLY.

Witnesses:
Jos. T. MULLIGAN,
J. M. ABRAMS.

---

Copies of this patent may be obtained for five cents each, by addressing the "Commissioner of Patents, Washington, D. C."